(12) United States Patent
Al Ghamdi

(10) Patent No.: US 11,098,581 B2
(45) Date of Patent: Aug. 24, 2021

(54) METHOD OF OPERATING AN OIL/GAS FACILITY BASED ON ACCURATE DETERMINATION OF CAPILLARY PRESSURE AND INTERFACIAL TENSION

(71) Applicant: Saudi Arabian Oil Company, Dhahran (SA)

(72) Inventor: Bander Nasser Al Ghamdi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 213 days.

(21) Appl. No.: 16/269,840

(22) Filed: Feb. 7, 2019

(65) Prior Publication Data
US 2020/0256186 A1    Aug. 13, 2020

(51) Int. Cl.
*E21B 49/00* (2006.01)
*E21B 47/06* (2012.01)
*G01V 9/00* (2006.01)
*E21B 43/20* (2006.01)

(52) U.S. Cl.
CPC .............. *E21B 49/00* (2013.01); *E21B 47/06* (2013.01); *G01V 9/007* (2013.01); *E21B 43/20* (2013.01)

(58) Field of Classification Search
CPC .......... E21B 49/00; E21B 47/06; E21B 43/20; E21B 43/12; E21B 43/18; E21B 43/00; E21B 2200/20; G01V 9/007
See application file for complete search history.

(56) References Cited

U.S. PATENT DOCUMENTS

| | | | |
|---|---|---|---|
| 6,101,447 A * | 8/2000 | Poe, Jr. | E21B 49/00 702/13 |
| 2009/0157590 A1 | 6/2009 | Mijares et al. | |
| 2010/0250206 A1 | 9/2010 | Yogeswaren | |
| 2015/0284621 A1* | 10/2015 | Marchesini | C04B 40/0032 166/293 |
| 2017/0076022 A1* | 3/2017 | Chin | G06F 30/23 |

OTHER PUBLICATIONS

International Search Report and Written Opinion in Corresponding PCT Application No. PCT/US2020/016602 dated May 29, 2020. 8 pages.
Al Ghamdi, et al. "Examination of unconventional phenomena in naturally fractured liquid-rich gas reservoirs: single-block compositional model." *Journal of Petroleum Exploration and Production Technology* 7.1 (2017): 265-279.

(Continued)

*Primary Examiner* — Giovanna Wright
*Assistant Examiner* — Yanick A Akaragwe
(74) *Attorney, Agent, or Firm* — Leason Ellis LLP

(57) ABSTRACT

A computerized method and system for of operating an oil/gas facility for processing oil and gas from a reservoir. The method includes steps of receiving input data concerning condensate phase and gas phase components in the reservoir, the input data characterizing both phase components, determining a pore capillary pressure of the reservoir based on the received input data which characterizes the phase components, determining PVT parameters of the reservoir phase components based on the determined pore capillary pressure, and controlling a setting of the oil/gas facility based on the determined PVT parameters of the reservoir phase components.

17 Claims, 12 Drawing Sheets

(56) References Cited

OTHER PUBLICATIONS

Nojabaei, et al. "Effect of capillary pressure on phase behavior in tight rocks and shales." *SPE Reservoir Evaluation & Engineering* 16.03 (2013): 281-289.

Zhang, Yuan, et al. "Capillary pressure effect on hydrocarbon phase behavior in unconventional reservoirs." *SPE Low Perm Symposium.* Society of Petroleum Engineers, 2016.

Wang, Lei, et al. "Effect of pore-size distribution on phase transition of hydrocarbon mixtures in nanoporous media." *SPE Journal* 21.06 (2016): 1-981.

Al Ghamdi. "Examination of Unconventional Phenomena in Naturally Fractured Liquid-Rich Gas Reservoirs: Single-Block Compositional Model." *A Dissertation in Energy and Mineral Engineering, The Pennsylvania State University, The Graduate School, John and Willie Leone Family Department of Energy and Mineral Engineering.*

* cited by examiner

METHOD OF OPERATING AN OIL/GAS FACILITY BASED ON ACCURATE DETERMINATION OF CAPILLARY PRESSURE AND INTERFACIAL TENSION

FIELD OF THE DISCLOSURE

The present invention relates to oil and gas production, and, more particularly, relates to a method of operating an oil/gas separation facility based on accurate determination of downhole capillary pressure and interfacial tension in oil/gas reservoirs.

BACKGROUND OF THE DISCLOSURE

Due to the partial inaccessibility and complexity of oil/gas reservoirs, it is not always possible to obtain accurate field-experimental data of all of the numerous parameters that can affect production from the reservoirs. Mathematical models for predicting values of reservoir parameters have been developed to compensate for this problem. However, there are important parameters that are typically poorly modeled or not accounted for at all.

One important example of parameters that are not generally adequately determined is pore capillary pressure. To date, the industry standard is to calculate capillary pressure from core samples, which is not necessarily commensurate with capillary pressure inside of the pores within a reservoir. Since pore capillary pressure has a direct effect on fluid saturation pressure, it also has a direct impact on the ultimate recovery of fluids from the reservoir.

It would therefore be advantageous to provide a method of accurately determining pore capillary pressure in oil/gas reservoirs for adapting control settings for separation and other production processes in view of that determination so as to optimize fluid recovery.

SUMMARY OF THE DISCLOSURE

The present disclosure provides embodiments of a non-transitory computer-readable medium comprising instructions which, when executed by a computer system, cause the computer system to carry out a method of operating an oil/gas facility for processing oil and gas from a reservoir, including steps of receiving input data concerning condensate phase and gas phase components in the reservoir, the input data characterizing both phase components, determining a pore capillary pressure of the reservoir based on the received input data which characterizes the phase components, determining PVT parameters of the reservoir phase components based on the determined pore capillary pressure, and controlling a setting of the oil/gas facility based on the determined PVT parameters of the reservoir phase components.

In certain embodiments, the step of determining the PVT parameters includes calculations that account for both gas and condensate phase pressures.

In further embodiments, the non-transitory computer-readable medium further includes instructions for carrying out the step of determining of a phase region of the reservoir.

Using the accurate PVT parameters that take into account capillary pressure, adjustments can be made depending on conditions of the reservoir. For example, surface facilities settings can be adjusted to accommodate a higher saturation pressure and condensate-to-gas ratio due to the pore capillary pressure when the reservoir is operating in a two-phase gas-condensate region. In other instances, surface facilities settings can be adjusted to accommodate a lower saturation pressure and larger dry oil production due to the pore capillary pressure when the reservoir is operating in a dissolved-gas phase region.

In addition, water injection rates can be adjusted to support reservoir pressure when the reservoir is operating in a two-phase gas-condensate region depending upon the accurate PVT parameters calculated according to the present disclosure.

In some implementations, the PVT parameters can comprise one or more parameters selected from the group consisting of: include vaporized oil-gas ratio ($R_v$), solution-gas ratio ($R_s$), formation volume factor for gas ($B_g$) and formation volume factor for oil ($B_o$). The vaporized oil-gas ratio ($R_v$), solution-gas ratio ($R_s$), formation volume factor for gas ($B_g$) and formation volume factor for oil ($B_o$) can be determined a function of gas pressure ($P_g$), oil pressure ($P_o$) and pore throat radius (r).

The present disclosure also provides a system for operating an oil/gas facility for processing oil and gas from a reservoir. The system comprises at least one facility component having a setting that is configured to be adjusted based on a current saturation pressure of the reservoir; and a controller including one or more processor and memory, the memory including program code instructions that when executed by the one or more processors. The controller, executing the instructions, carries out the steps of: receiving input data concerning condensate phase and gas phase components in the reservoir, the input data characterizing both phase components; determining a pore capillary pressure of the reservoir based on the received input data which characterizes the phase components; determining PVT parameters of the reservoir phase components based on the determined pore capillary pressure; and controlling the setting of the at least one facility component based on the determined PVT parameters of the reservoir phase components.

In certain embodiments, the at least one facility component is an oil/gas separator.

In certain embodiments, the step of determining the PVT parameters includes calculations that account for both gas and condensate phase pressures.

The code executed by the one or more processors of the controller can further include instructions for carrying out the step of determining of a phase region of the reservoir. Depending on the state of the reservoir, the step of setting of the oil/gas facility based on the determined PVT parameters can include adjusting the at least one facility component to accommodate a higher saturation pressure and condensate-to-gas ratio due to the pore capillary pressure when the reservoir is operating in a two-phase gas-condensate region. In other instances, the step of setting of the oil/gas facility based on the determined PVT parameters includes adjusting the at least one facility component to accommodate a lower saturation pressure and larger dry oil production due to the pore capillary pressure when the reservoir is operating in a dissolved-gas phase region.

In some embodiments, the disclosed system includes a water injection pump for maintaining fluid pressure within the reservoir. In such embodiments, the step of controlling a setting of the oil/gas facility can include increasing a water injection rate of the pump to support reservoir pressure when the reservoir is operating in a two-phase gas-condensate region.

In certain implementations, the PVT parameters can include one or more of the following: a vaporized oil-gas ratio ($R_v$), a solution-gas ratio ($R_s$), a formation volume factor for gas ($B_g$) and a formation volume factor for oil ($B_o$). The code executed by the one or more processors of the controller can further include instructions for carrying out the step of calculating one or more of the following parameters: the vaporized oil-gas ratio ($R_v$), the solution-gas ratio ($R_s$), the formation volume factor for gas ($B_g$) and the formation volume factor for oil ($B_o$) as a function of gas pressure ($P_g$), oil pressure ($P_o$) and pore throat radius (r).

These and other aspects, features, and advantages can be appreciated from the following description of certain embodiments of the invention and the accompanying drawing figures and claims.

DETAILED DESCRIPTION OF CERTAIN EMBODIMENTS OF THE DISCLOSURE

Figure 1:
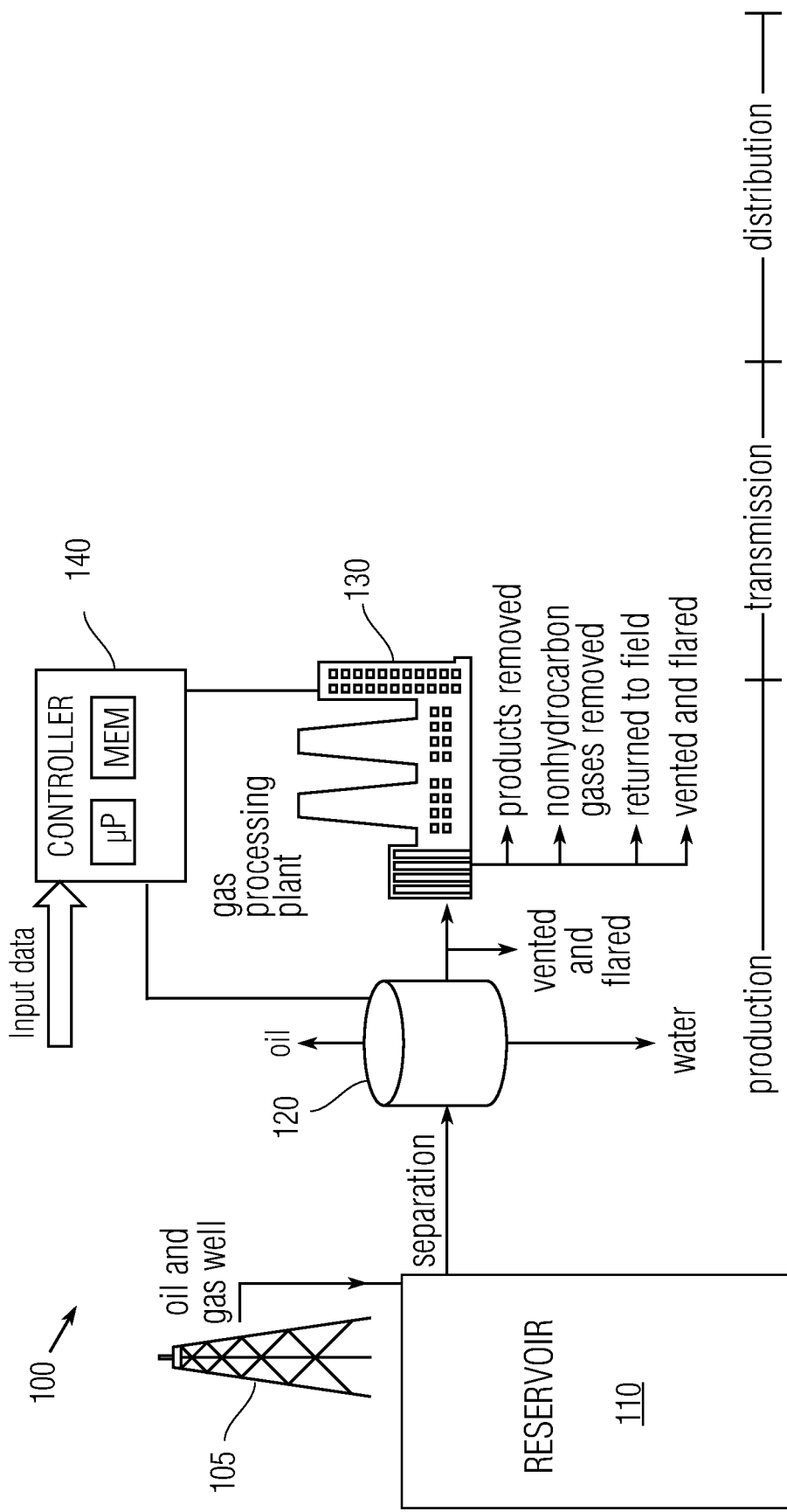
FIG. 1 is a schematic block diagram of a simplified oil/gas production system in which the method of the present disclosure can be employed.

By way of overview, the present invention provides a method of operating surface oil/gas processing facilities based on an accurate determination of downhole pore capillary pressure. The oil and gas (condensate and gas) within the reservoir is a two-phase system that is affected by temperature and pressure. Knowledge of when the single phases split into two-phase gas/condensate mixture is important factor in optimizing production because phase-splitting is associated with blockage of reservoir pores, leading to sub-optimal extraction rates.

There is a critical temperature and pressure at which the phase compositions and all phase properties are identical. The critical temperature and pressure is affected by pore capillary pressure ($P_c$). In the Gas-Condensate phase space (i.e., a Temperature/Pressure diagram) to the right of the critical point, as the reservoir fluids are extracted at constant temperature (isothermally), an accurate modeling of the capillary pressure predicts an increase in saturation pressure (relative to conventional modeling). Accordingly, when the temperature is above the critical point, the two-phase region is attained earlier in the life of the reservoir, which implies a higher Condensate-to-Gas-Ratio (CGR) for production. The pressure and temperature maintained at surface facilities such as condensate/gas as oil/gas separators can be adjusted by a controller to accommodate the change in CGR composition.

Conversely, in the Gas-Condensate phase space to the left of the critical point, which is a single-phase Condensate region, as the reservoir fluid is being produced isothermally, an accurate modelling of $P_c$ predicts a decrease saturation pressure. In this event, the production of dry oil is predicted will continue beyond expectations before a two-phase split occurs due to lower saturation pressure (2-phase split). The temperature and pressure of the separation facilities can be adjusted in this case as well to maximize condensate production. In addition, in cases in which water injection is used to maintain reservoir pressure above the saturation point to maintain a single phase, accurate modelling of $P_c$ predicts that a higher injection rate is required to maintain pressure above saturation relative to conventional modeling. In these non-limiting examples, the controller of the facility adjusts facility settings to optimize condensate production and to avoid phase splitting which leads to pore blockage.

Also disclosed herein is an method for determining pore capillary pressure created inside the pores as a function of pore throat radius, and a method of determining the effects of accurately determined capillary pressure on fluid phase behavior and parameters used in reservoir Black-Oil Simulators, including vaporized oil-gas-ratio ($R_v$), solution gas-oil-ratio ($R_s$), and formation volume factors of gas and oil ($B_g$ and $B_o$). These parameters, referred to herein as "PVT parameters" herein, are useful for determining how settings should be controlled to optimized production.

The Walsh method is a known procedure for calculating these parameters. However, the conventional Walsh procedure uses a single phase pressure ($P_g$, gas pressure), and does not account for two-phase pressures ($P_g$ and $P_o$, condensate partial pressure). Accounting for two phase pressures changes the properties of the fluid; generally, when two-phase pressures are accounted for, the effect is for modeled reservoir fluid to split into gas and condensate phases earlier during production that predicted conventionally. Embodiments of the methods disclosed herein also include determining the contents of the reservoir fluids based on multiple phases, referred to as an "unconventional flash" procedure. The results of the unconventional flash procedure are used as inputs to a modified Walsh procedure that accounts for both $P_g$ and $P_o$. As a result of these procedures, the component ratios and formation factors are determined with greater accuracy than has been possible heretofore.

FIG. 1 is a schematic block diagram of a simplified oil/gas production system in which the method of the present disclosure can be employed. The system 100 includes one or more oil wells 105 that pumps fluid (gas and condensates) from an oil/gas reservoir 110. The reservoir 110 can include formations in which oil and gas is contained in small pore holes having diameters on the order of nanometers or microns. Gas and condensates drawn from the well 105 are delivered to a separator 120 in which the gas portion and condensate portion or separated from each other. In some embodiments, the system can include a plurality of separators arranged in series. The separated gas is supplied to a processing facility in which gas products are further refined and filtered. A controller 140, which can include one or more processors 142 and cache memory resources 144 is in communication with the separator 120 and the processing facility 130. The controller 140 can comprise a single device or can comprise a plurality of distributed, communicatively coupled devices. The controller 140 receives input data which can include real-time data received from downhole well sensors, well logs, and/or fluid and core sample data. The controller can execute a program including instructions for determining pore capillary pressure and PVT properties as described below, as well as a program for adjusting settings of facility components based on the determinations of capillary pressure and PVT properties.

Figure 2:
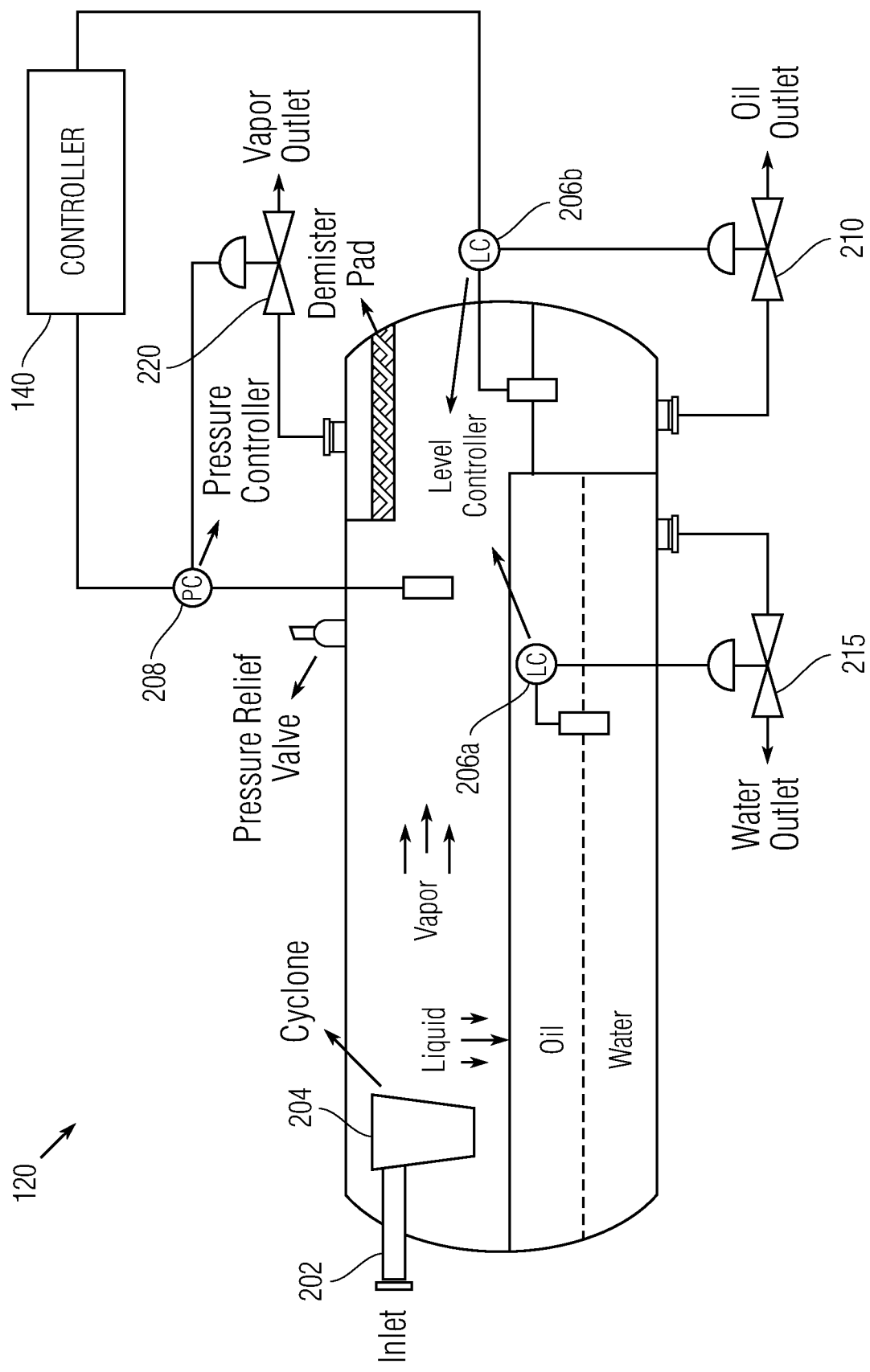
FIG. 2 a schematic cross-sectional view of an exemplary separator that can be controlled according to the methods disclosed herein.

FIG. 2 is a schematic cross-sectional view of an exemplary separator that can be controlled according to the methods disclosed herein. The separator 120 includes an inlet which receives fluid pumped from the reservoir 110 via an inlet 202. Fluid entering the inlet 202 is delivered to a cyclone 204 which separates the condensate phase (oil and water) from the vapor phase of the fluid. The separator includes level controller 206a and 206b that are operated by algorithmic control by controller 140 via wired or wireless connection. The level controllers 206a and 206b can be used to control valves leading an oil and waters outlets 210, 215. The oil outlet can lead to further separators or to a processing facility. A pressure controller 208 is also operated by algorithmic control by controller 140 by wired or wireless connection. The controller 140 thereby can set the vapor pressure within the separator, which determines the amount of oil that is separated, in order to maximize oil recovery according to the methods disclosed herein. The vapor temperature can be controlled indirectly via control of the pressure. A vapor outlet 220 delivers the vapor phase to additional separators or to the oil processing facility.

Determination of Black-Oil Properties Including Effect of Capillary Pressure

A. Determination Whether Mixture is Single-Phase vs. Two-Phase

Figure 3:
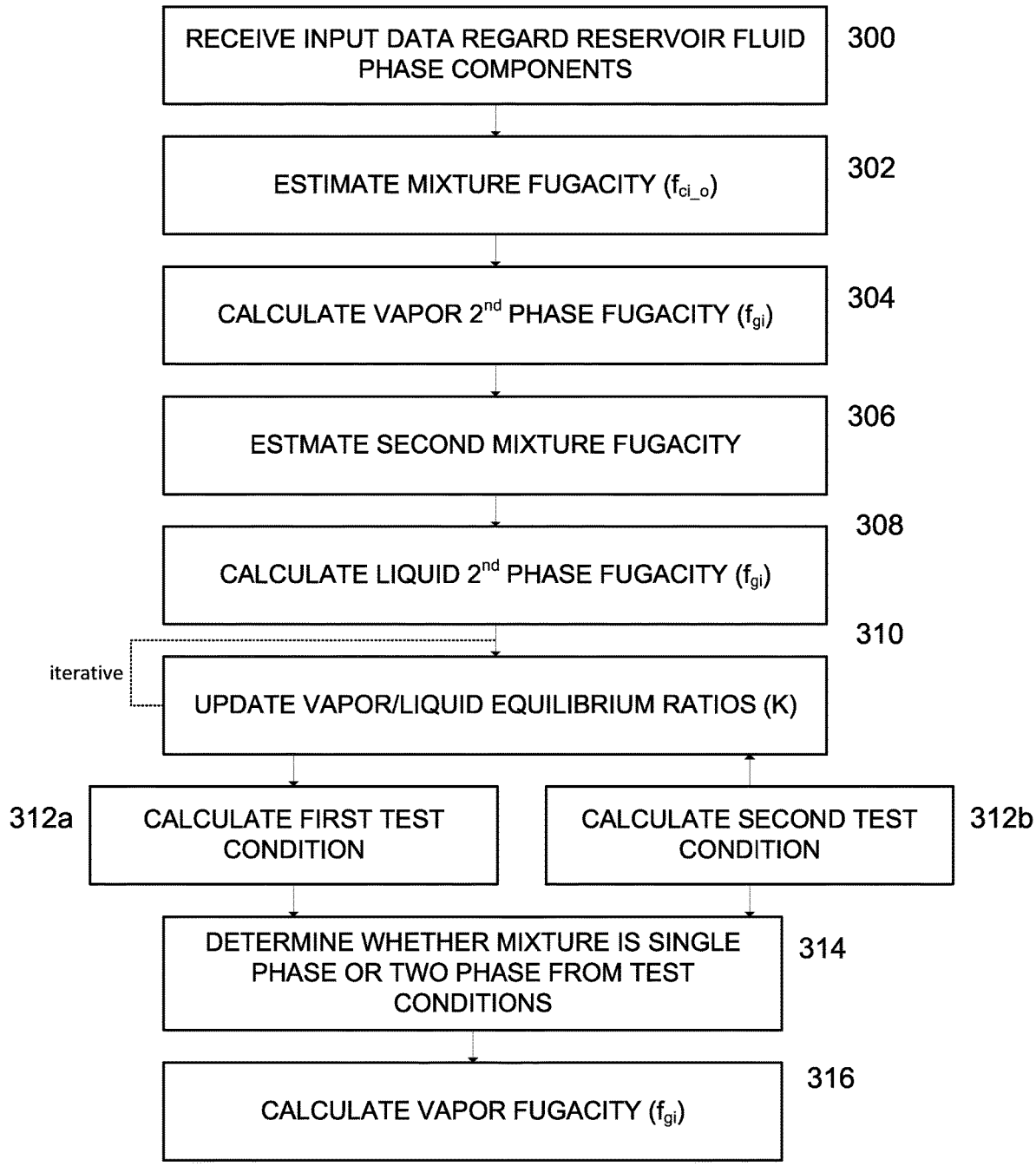
FIG. 3 is a flow chart of an embodiment of a method for determining whether the reservoir fluid is single phase or two-phase according to the present disclosure.

Embodiments of the method of the present invention begin with a method for determining pore capillary pressure in a target reservoir. This method can be sub-divided into several procedures that are performed in sequence. FIG. 3 is a flow chart of a sub-procedure in which it is initially determined whether the reservoir fluid, as described by input data, is single phase or two-phase. The procedure is guided by program code instructions ("algorithm") that can be executed by the controller 140 or by another computing device that is operative to communicate the results of execution of the program code with the controller. In an initial preparatory step (300), the input data is received by the executing computing device. The input data includes reservoir fluid characterization for each phase component such as i) compositions (in molar units); ii) Critical Pressure (in psia); iii) Critical Temperature (R in degrees Kelvin); an iv) Acentric factor (unitless); v) Molecular Weight (lbm/lbmol); vi) Critical Volume (in cubic feet/lbm); and vii) a Parachor factor (unitless). This data can be acquired from experimental sensor data obtained from reservoir samples and also from Constant-Composition-Expansion, Constant-Volume-Depletion, and Chromatographic tests. In addition to the fluid characterization parameters, data is input regarding interactions between the phase components, selections of equation-of-state (EOS), initial reservoir pressure and temperature, pressures and temperatures under investigation, volume shift factors, separator conditions (pressure and temperature), and pore throat radius (r) in nanometers (nm).

After entering all the reservoir data, the algorithm is executed to determine the stability of the fluid-in-place under the input conditions. The algorithm includes numerous calculations that use the input data to determine intermediate parameters, and final output from the intermediate parameters. All calculation or determination steps in the present algorithm of FIG. 3 and other algorithms discussed below are executed by one or more processors based on program code instructions which utilize input data received or calculated in previous steps. The output of the present algorithm indicates whether the fluid is in a single-phase (gas or condensate) or in two phases (gas and condensate). In a first step of the algorithm (302), a mixture fugacity ($f_{ci\_o}$) is estimated as a function of fugacity ($\phi_{ci}$), overall composition of the ith component ($c_i$) and original phase initial pressure ($p_f$):

$$f_{ci\_o}=\phi_{ci} \cdot c_i \cdot p_f;\ i=1,2,\ldots n_c \quad (1)$$

$$\phi_{ci}=f(c_i,p_f) \quad (2)$$

The fugacity is a correction to ideal gas pressure made for real gases and condensed phases. It is required for correct determinations of chemical equilibrium. In a following step (304), the vapor second-phase fugacity ($f_{gi}$) is calculated using the original phase initial pressure and normalized second-phase vapor mole fractions ($y'_i$) and vapor/liquid equilibrium ratios ($K_i$):

$$f_{gi}=\phi_{gi} \cdot y'_i \cdot p_f;\ i=1,2,\ldots n_c \quad (3)$$

$$y'_i=(c_i \cdot K_i)/(\Sigma_i^{nc}(c_i \cdot K_i)) \quad (4)$$

In a following step (306), liquid-like second mixture calculations are performed, analogous to those of step (302) by calculating the mixture fugacity ($f_{ci\_g}$) as a function of fugacity ($\phi_{ci}$), overall composition ($c_i$) and original phase initial pressure ($p_f$) based on equations (1) and (2). In step (308), a liquid second-phase fugacity ($f_{li}$) is determined using original phase initial pressure and the normalized second-phase liquid mole fractions ($x'_i$) using equations analogous to (3) and (4) but for the liquid second-phase.

The K values (vapor/liquid equilibrium ratios) are updated iteratively in step (310) until either convergence or a trivial solution is achieved. Determination of the K-values is performed for each of the created phases separately by checking for the conditions described by equations (9) and (10) as follows.

Convergence criterion: (5)

$$\sum_i^{n_c}(R_i-1)^2 < 10^{-10};\ i=1,2,\ldots n_c$$

Trivial solution criterion: (6)

$$\sum_i^{n_c}(\ln K_i)^2 < 10^{-4};\ i=1,2,\ldots n_c$$

In equation (5), values of $R_i$ are determined for the vapor second phase and the liquid second phase. For the vapor second phase, $R_i$ is determined as $$R_i=f_{ci\_o}/f_{gi} \cdot 1/(\Sigma_i^{nc}(c_i \cdot K_i)) \quad (7)$$

For the liquid second phase, $R_i$ is determined as $$R_i=f_{li}/f_{ci\_g} \cdot \Sigma_i^{nc}(c_i/K_i) \quad (8)$$

Once either convergence has occurred or the trivial solution is obtained, it can then be determined whether the mixture is considered to be two phase or a single phase. In step (312a) a first test condition is calculated based on $$S_V = \Sigma_i^{nc}(c_i \cdot K_i) \quad (9)$$

In step (312b) a second test condition is calculated based on $$S_L = \Sigma_i^{nc}(c_i / K_i) \quad (10)$$

The mixture is determined, in step (314), to be two-phase if either $S_V$ or $S_L$ from equation (9) or (10) is greater than one. The mixture is determined to be single phase if both tests produces in a trivial solution, both of $S_V$ and $S_L$ are less than one, or one of the tests produces a trivial solution and the other yields a value of $S_V$ or $S_L$ less than one.

In step (316), if it is determined that the mixture is two-phase, the controller or other computing device generates an alert to the user (e.g., process engineer) that the mixture is determined to be in two-phases. Better results for calculation of PVT properties for process control are generally obtained outside of the two-phase region. Accordingly, the alert can request that the user readjust the initial temperature and pressure inputs.

B. Determination Whether the Reservoir is an Oil or Gas Reservoir

Figure 4:
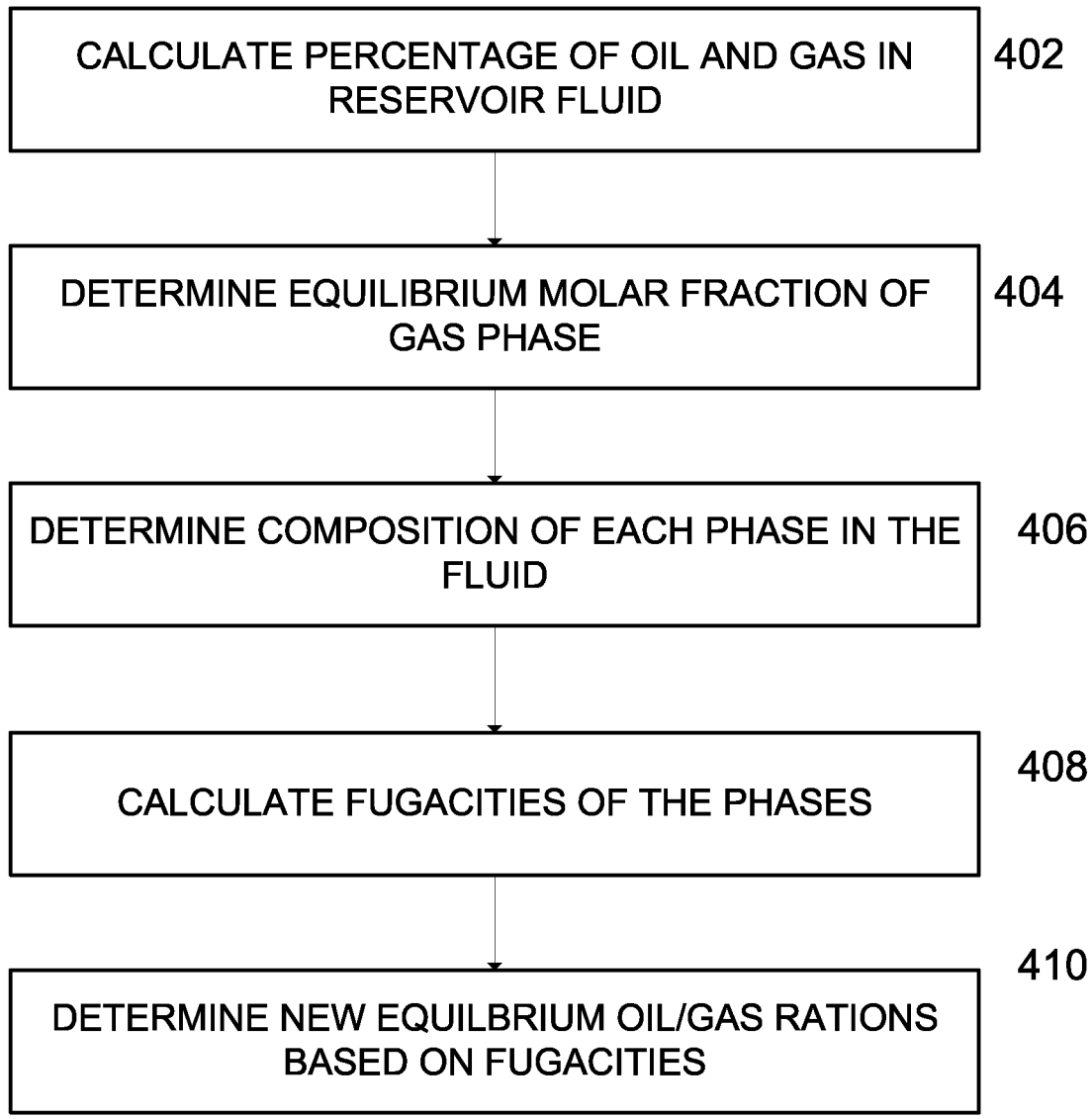
FIG. 4 is a flow chart of an embodiment of a method for determining whether the single-phase is condensate or gas according to the present disclosure.

After it is determined that the mixture is in a single phase, in a second sun-procedure shown in FIG. 4, the algorithm executes another test to determine whether the single phase is liquid or gas (i.e., whether the reservoir is a liquid condensate (oil) reservoir or a gas reservoir). This test employs equilibrium phase molar fraction in what are referred to as "Flash Calculations" in the art. In step (402) the percentage of oil and gas ($K_i$) is calculated using the following nonlinear equation in which $\alpha_g$ is the equilibrium molar gas fraction, $p_{ri}$ is the system pressure divided by the critical temperature for the component, $\omega_i$ is the acentric factor of the component (i.e., variation from noble gas behavior), and $T_{ri}$ is the system pressure divided by the critical temperature of the component. Equation (11) is the Rachford-Rice equation, and equation (13) is Wilson's correlation for K-value estimation.

$$f(\alpha_g) = \Sigma_i^{nc}(c_i(K_i-1))/(1+\alpha_g(K_i-1)) = 0; i=1,2 \ldots, n_c \quad (11)$$

$$K_i = y_i/x_i; i=1,2 \ldots, n_c \quad (12)$$

$$K_i = 1/p_{ri} \cdot \exp^{5.37(1+\omega_i)(1-1/T_{ri})}; i=1,2 \ldots, n_c \quad (13)$$

Equation (11) is a nonlinear equation. Once the $K_i$ values have been estimated for each component, in step (404) a calculation known as a Newton-Raphson procedure is used to obtain solutions to equation (11) to determine the equilibrium molar fraction of the gas phase. The Newton-Raphson procedure is an iterative technique that has a rapid rate of convergence. A new estimate of equilibrium molar fraction $\alpha_g^{new}$ is calculated based on the previous estimate $\alpha_g^{old}$ as $$\alpha_g^{new} = \alpha_g^{old} - \frac{f(\alpha_g^{old})}{f'(\alpha_g^{old})} \quad (14)$$

in which f'($\alpha_g$) is calculated based on (11) above as $$f'(\alpha_g) = -\sum_{i=1}^{n_c} \frac{c_i(K_i-1)^2}{[1+\alpha_g(K_i-1)]^2} = 0; i=1,2 \ldots, n_c \quad (15)$$

In applying the Newton-Raphson procedure in step (404), the algorithm includes a configurable threshold for setting an acceptable accuracy for the procedure. In some embodiments the criteria can be set as $$|\alpha_g^{new} - \alpha_g^{old}| < 1.10^{-x} \quad (16)$$

in which x is a value between −16 and −12 (e.g., −14)

In addition to the Newton-Raphson procedure, which concerns equilibrium molar estimations, a further set of Fugacity procedures are calculated in order to reach a final convergence (solution) for equilibrium molar phase fractions. In step (406), the composition of each phase is calculated based on the solution for $\alpha_g$ $$x_i(\text{liquid}) = \frac{c_i}{1+\alpha_g(K_i-1)}; i=1,2 \ldots, n_c \quad (17)$$

$$y_i(\text{gas}) = \frac{K_m c_i}{1+\alpha_g(K_i-1)} = K_i x_i; i=1,2 \ldots, n_c \quad (18)$$

Equilibrium is satisfied when the potential net transfer of each component between the two phases is approximately zero. This occurs when the fugacity of the gas phase of component i is equal to the fugacity of the liquid phase of the same component (shown in equation 19). In step (408), the fugacities of the phases are calculated based on the condition expressed in equation (23) below employing the expressions in equations (19-22) restated using the terms of equations (24-30). In the equations below, the parameter Z is the compressibility factor of the gas phase.

$$f_{gi} = f_{li}; m=1,2 \ldots, n_c \quad (19)$$

$$f_{gi} = \phi_{gi} \cdot y_i \cdot p_g; i=1,2 \ldots, n_c \quad (20)$$

$$f_{li} = \phi_{li} \cdot x_i \cdot p_o; i=1,2 \ldots, n_c \quad (21)$$

$$\ln \phi_{fi} = -\ln(Z-B) + \quad (22)$$

$$\frac{A}{(m_1-m_2)B}\left(\frac{2\sum_{j=1}^{n_c}A_{ij}c_j}{A}-\frac{B_i}{B}\right)\ln\left[\frac{Z+m_2 B}{Z+m_1 B}\right]+\frac{B_i}{B}(Z-1)$$

$$Z^3 + [(m_1+m_2-1)B-1]Z^2 + \quad (23)$$
$$[A+m_1 m_2 B^2 - (m_1+m_2)B(B+1)]Z - [AB+m_1 m_2 B^2(B+1)] = 0$$

$$A = \sum_i^{n_c}\sum_j^{n_c} c_i c_j A_{ij} \quad (24)$$

$$A_{ij} = (1-\delta_{ij})(A_i A_j)^{0.5} \quad (25)$$

$$A_i = \Omega_{ai}^o[1+m_i(1-T_{ri}^{0.5})]^2 \frac{P_{ri}}{T_{ri}^2} \quad (26)$$

$$B = \sum_{i=1}^{n_c} c_i B_i \quad (27)$$

$$B_i = \Omega_{bi}^o \frac{P_{ri}}{T_{ri}} \quad (28)$$

$$P_{ri} = \frac{P}{P_{ci}} \quad (29)$$

$$T_{ri} = \frac{T}{T_{ci}} \quad (30)$$

Once fugacities of the phases are known, in step (410), improved $K_i^{new}$ values are calculated based on the fugacity values using equation (31).

$$K_i^{(n+1)} = K_i^{(n)} \cdot \left(\frac{f_{li}}{f_{gi}}\right)^{(n)} \quad (31)$$

The following is the final criterion to be checked to indicate convergence of the bigger loop:

$$\sum_i^{n_c} \left(\frac{f_{li}}{f_{gi}} - 1\right)^2 < 10^{-13}; i = 1, 2 \ldots, n_c \quad (32)$$

Once this criterion is met the estimated values of equilibrium molar phase fractions are considered final. For example, if the calculated equilibrium molar vapor fraction is 1, this means that the system is in a single phase and it is found initially in a gaseous form. Alternatively, if the calculated equilibrium molar vapor fraction is zero, this means the initial state of the fluids-in-place is 100 percent oil.

C. Determination of Capillary Pressure

Figure 5A:
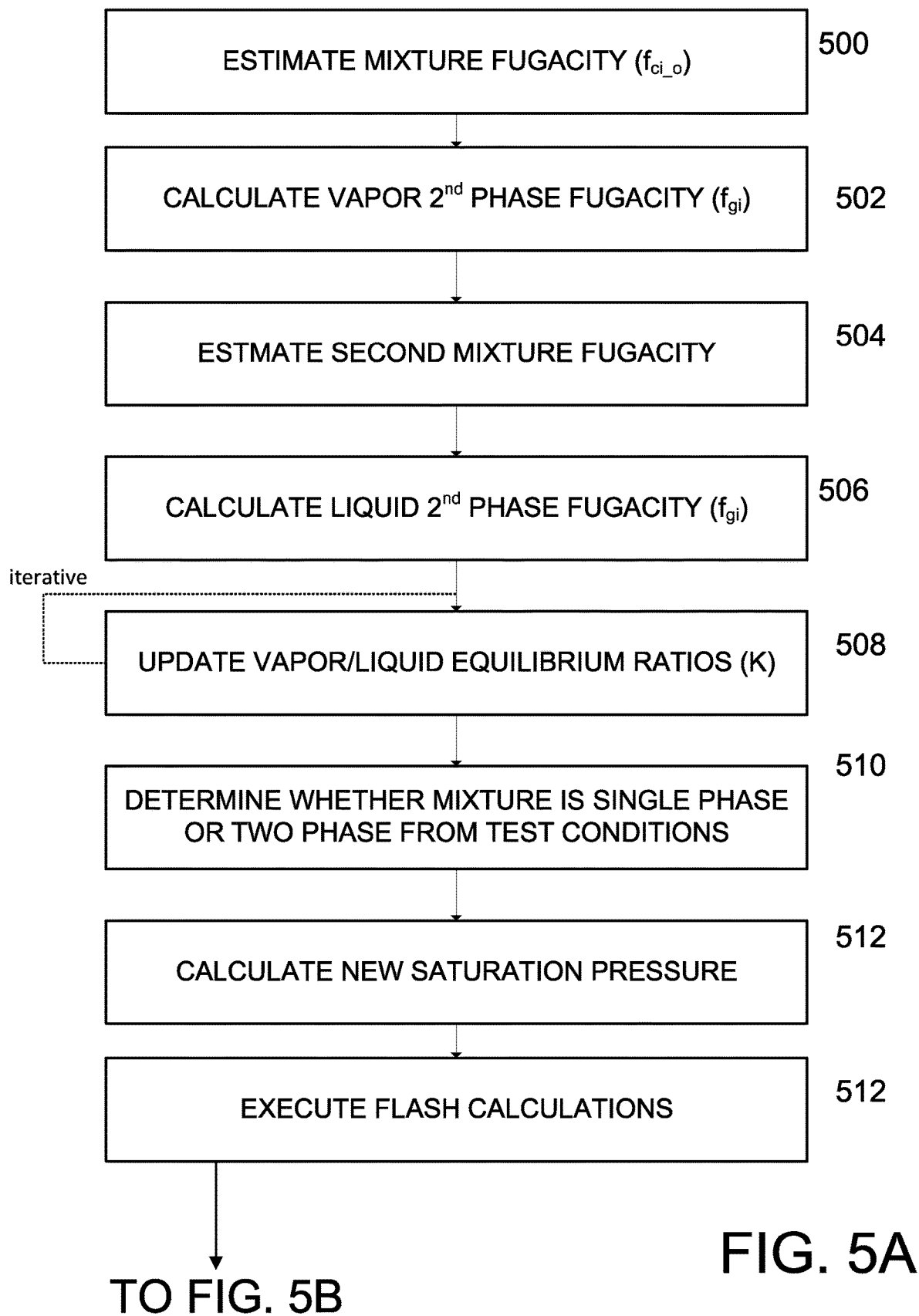
FIG. 5A is a flow chart of an embodiment of a method for determining the pore capillary pressure based on the values of equilibrium molar phase fraction according to the present disclosure.

FIG. 5A is a flow chart of an embodiment of a method for determining the pore capillary pressure based on the values of equilibrium molar phase fraction determined as described above. The method is similarly executed by the controller or another computing device in communication with the controller using stored program code instructions and input data. Certain investigations have demonstrated that capillary pressure inside the pores tends reduce the bubble point curve and increase the upper dew point curve. The fact that there is a capillary pressure means that if the system is in two-phase, gas pressure will be different than oil pressure with the same magnitude of capillary pressure. In a first step (500), the mixture fugacity ($f_{ci\_o}$) as determined as a function of fugacity, overall composition ($c_i$) and oil pressure ($p_o$):

$$f_{ci\_o} = \phi_{ci} \cdot c_i \cdot p_o; i = 1, 2, \ldots n_c \quad (33)$$

$$\phi_{ci} = f(c_i; p_o) \quad (34)$$

In a following step (50g2), the vapor second-phase fugacity ($f_{gi}$) is determined using gas pressure and the normalized second-phase vapor mole fractions ($y'_i$):

$$f_{gi} = \phi_{gi} \cdot y'_i \cdot p_g; i = 1, 2, \ldots n_c \quad (35)$$

$$y'_i = \frac{c_i \cdot K_i}{\sum_i^{n_c} (c_i \cdot K_i)} \quad (36)$$

In step (504), which is analogous to step (500), liquid-like second mixture calculations are initiated by calculating the mixture fugacity ($f_{ci\_g}$) as a function of fugacity, overall composition ($c_i$) and gas pressure ($p_g$):

$$f_{ci\_g} = \phi_{ci} \cdot c_i \cdot p_g; i = 1, 2 \ldots n_c \quad (37)$$

$$\phi_{ci} = f(c_i; p_g) \quad (38)$$

In step (506), which is analogous to step (502), the liquid second-phase fugacity ($f_{li}$) is determined based on the oil pressure and the normalized second-phase liquid mole fractions ($x'_i$):

$$f_{li} = \phi_{li} \cdot x'_i \cdot p_o; i = 1, 2, \ldots n_c \quad (39)$$

$$x'_i = \frac{(c_i / K_i)}{\sum_i^{n_c} (c_i / K_i)} \quad (40)$$

In the following step (508), the K-values (in equation (40)) for each of the phases are updated with criteria as described above (equations (5) and (6)) until convergence or trivial solution is achieved. In step (510), it is determined whether the mixture is considered to be in single phase or in two phases in the same manner as described above with respect to step (314) of FIG. 3. In step (512), a new saturation pressure (bubble point or dew point) can be determined.

Figure 5B:
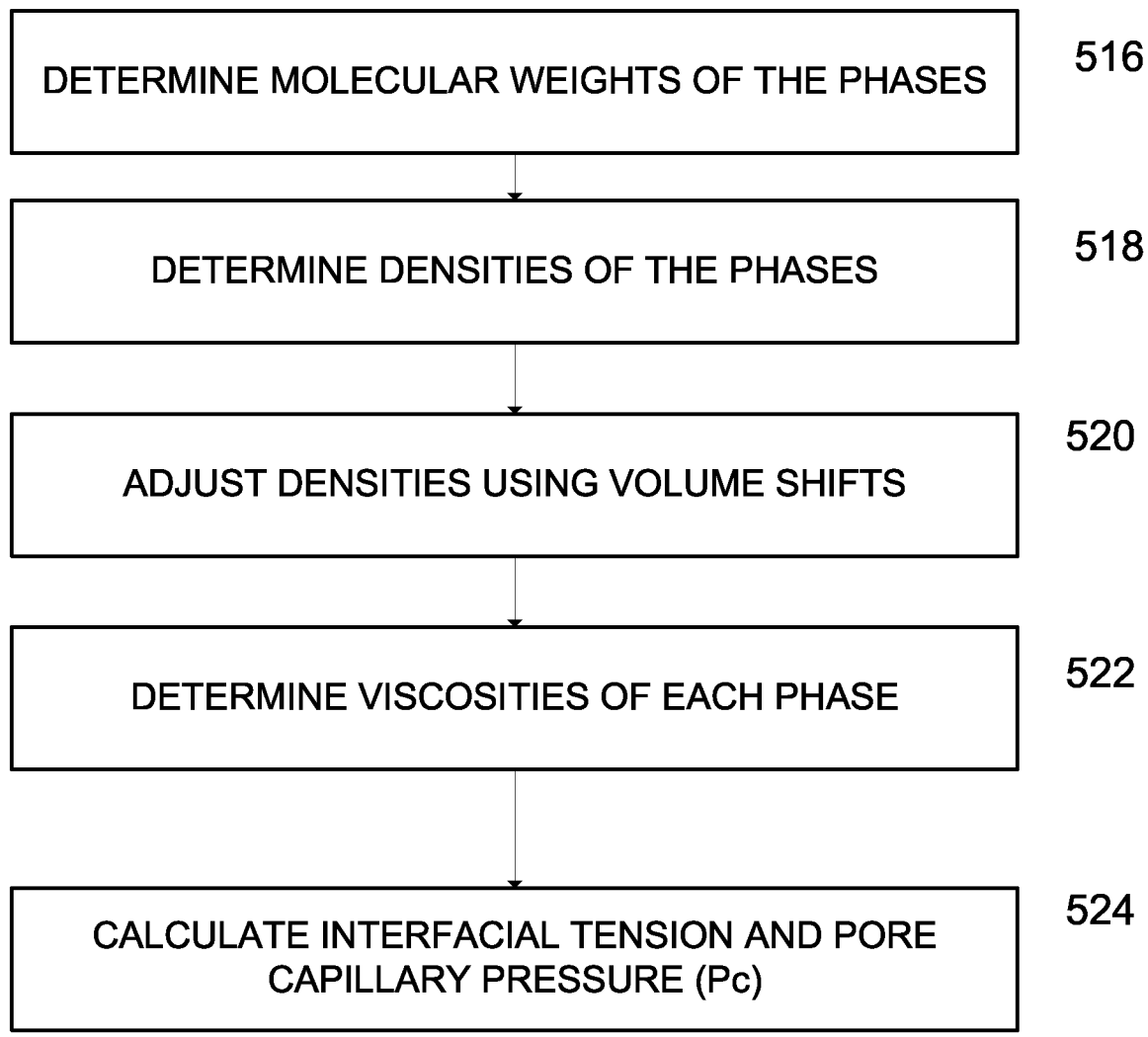
FIG. 5B is a continuation of the flow chart of FIG. 5A.

Using the new saturation pressure, an additional set of full Flash calculations including the physical properties of the oil and gas phases is executed in step (514). FIG. 5B is a continuation of the flow chart of FIG. 5A. In step (516) molecular weights of the phases are determined, and the densities of the phases are determined in step (518):

$$MW_g\left(\frac{\text{lb m}}{\text{lb mol}}\right) = \sum_{i=1}^{n_c} y_i MW_i; i = 1, 2 \ldots, n_c \quad (41)$$

$$MW_l\left(\frac{\text{lb m}}{\text{lb mol}}\right) = \sum_{i=1}^{n_c} x_i MW_i; i = 1, 2 \ldots, n_c \quad (42)$$

$$\rho_g\left(\frac{\text{lb m}}{\text{ft}^3}\right) = \frac{p MW_g}{Z_g RT} \quad (43)$$

$$\rho_l\left(\frac{\text{lb m}}{\text{ft}^3}\right) = \frac{p MW_l}{Z_l RT} \quad (44)$$

In step (520), the densities are recalculated using volume shift calculations:

$$\rho_{lsh} = \frac{MW_l}{V_L} \quad (45)$$

$$\rho_{vsh} = \frac{MW_g}{V_V} \quad (46)$$

in which $$V_L = V_L^{EOS} - \sum_{i=1}^n x_i c_i \quad (47)$$

$$V_V = V_V^{EOS} - \sum_{i=1}^{n} y_i c_i \quad (48)$$

$$c_i = s_i b_i \quad (49)$$

$$b_i = 0.0778 R \frac{T_{ci}}{P_{ci}} \quad (50)$$

The calculation of the molecular weight and modified density parameters enables the determination of the viscosity of each phase. In step (522), the viscosities are determined according to the viscosity model known as the Lorenz-Bay-Clark correlation, as follows:

$$\mu_f = \mu_f^* + \xi_f^{-1}\left[(0.1023 + 0.023364\rho_{r_f} + 0.058533\rho_{r_f}^2 - 0.040758\rho_{r_f}^3 + 0.0093724\rho_{r_f}^4)^4 - 1.10^{-4}\right]; f = g \text{ or } l \quad (51)$$

$$\mu_g^* = \frac{\sum_{i=1}^{n_c} y_i \mu_{i_f}^* \sqrt{MW_i}}{\sum_{i=1}^{n_c} y_i \sqrt{MW_i}}; i = 1, 2 \ldots, n_c \quad (52)$$

$$\mu_l^* = \frac{\sum_{i=1}^{n_c} x_i \mu_{i_f}^* \sqrt{MW_i}}{\sum_{i=1}^{n_c} x_i \sqrt{MW_i}}; i = 1, 2 \ldots, n_c \quad (53)$$

$$\mu_{i_g}^* = \frac{34.10^{-5} T_r^{0.94}}{\xi_i} \text{ for } T_r \le 1.5; i = 1, 2 \ldots, n_c \quad (54)$$

$$\mu_{i_g}^* = \frac{17.78.10^{-5}(4.58 T_r - 1.67)^{0.625}}{\xi_i} \text{ for } T_r > 1.5; \quad (55)$$

$$i = 1, 2 \ldots, n_c$$

in which $$\xi_i = \frac{5.4402 T_{ci}^{1/6}}{\sqrt{MW_i} \, p_{ci}^{2/3}}; i = 1, 2 \ldots, n_c \quad (56)$$

$$T_r = \frac{T}{T_{pc_g}} \quad (57)$$

$$T_{pc_g} = \sum_{i=1}^{n_c} y_i T_{ci}; i = 1, 2 \ldots, n_c \quad (58)$$

$$\mu_{i_l}^* = \frac{34.10^{-5} T_{ri}^{0.94}}{\xi_i} \text{ for } T_{ri} \le 1.5; i = 1, 2 \ldots, n_c \quad (59)$$

$$\mu_{i_l}^* = \frac{17.78.10^{-5}(4.58 T_{ri} - 1.67)^{0.625}}{\xi_i} \text{ for } T_{ri} > 1.5; \quad (60)$$

$$i = 1.2 \ldots, n_c$$

$$\xi_g = \frac{5.4402 T_{pc_g}^{1/6}}{\sqrt{MW_g} \, p_{pc_g}^{2/3}}; i = 1, 2 \ldots, n_c \quad (61)$$

$$\xi_l = \frac{5.4402 T_{pc_l}^{1/6}}{\sqrt{MW_l} \, p_{pc_l}^{2/3}}; i = 1, 2 \ldots, n_c \quad (62)$$

$$\beta_{pc_g} = \sum_{i=1}^{n_c} y_i \beta_{ci}; i = 1, 2 \ldots, n_c \text{ and } \beta = p, T, \text{ or } v \quad (63)$$

$$\beta_{pc_l} = \sum_{i=1}^{n_c} x_i \beta_{ci}; i = 1, 2 \ldots, n_c \text{ and } \beta = p, T, \text{ or } v \quad (64)$$

$$\rho_{r_g} = \frac{\rho_g}{\rho_{pc_g}} = \frac{\rho_g}{MW_g} \cdot \overline{v}_{pc_g} \quad (65)$$

$$\rho_{r_l} = \frac{\rho_l}{\rho_{pc_l}} = \frac{\rho_l}{MW_l} \cdot \overline{v}_{pc_l} \quad (66)$$

$$\overline{v}_{pc_g} = \sum_{i=1}^{n_c} y_i v_{ci} MW_i; i = 1, 2 \ldots, n_c \quad (67)$$

$$\overline{v}_{pc_g} = \sum_{i=1}^{n_c} y_i v_{ci} MW_i; i = 1, 2 \ldots, n_c \quad (68)$$

In step (524), based on the results of the full Flash calculations above, the interfacial tension (IFT) and capillary pressure ($P_c$) can be calculated as:

$$\sigma(IFT) = \sum_{i}^{n_c}\left[P_{n_i}\left(x_i \frac{\rho_o}{MW_o} - y_i \frac{\rho_g}{MW_g}\right)\right]^4 \quad (69)$$

$$P_c = \frac{2\sigma}{r} (r = \text{pore radius}) \quad (70)$$

The values of interfacial tension and capillary pressure constitute the is the final output of the procedures shown in the flow charts of FIGS. 5A and 5B.

D.1 Determination of PVT Properties (Gas Reservoir)

Figure 6A:
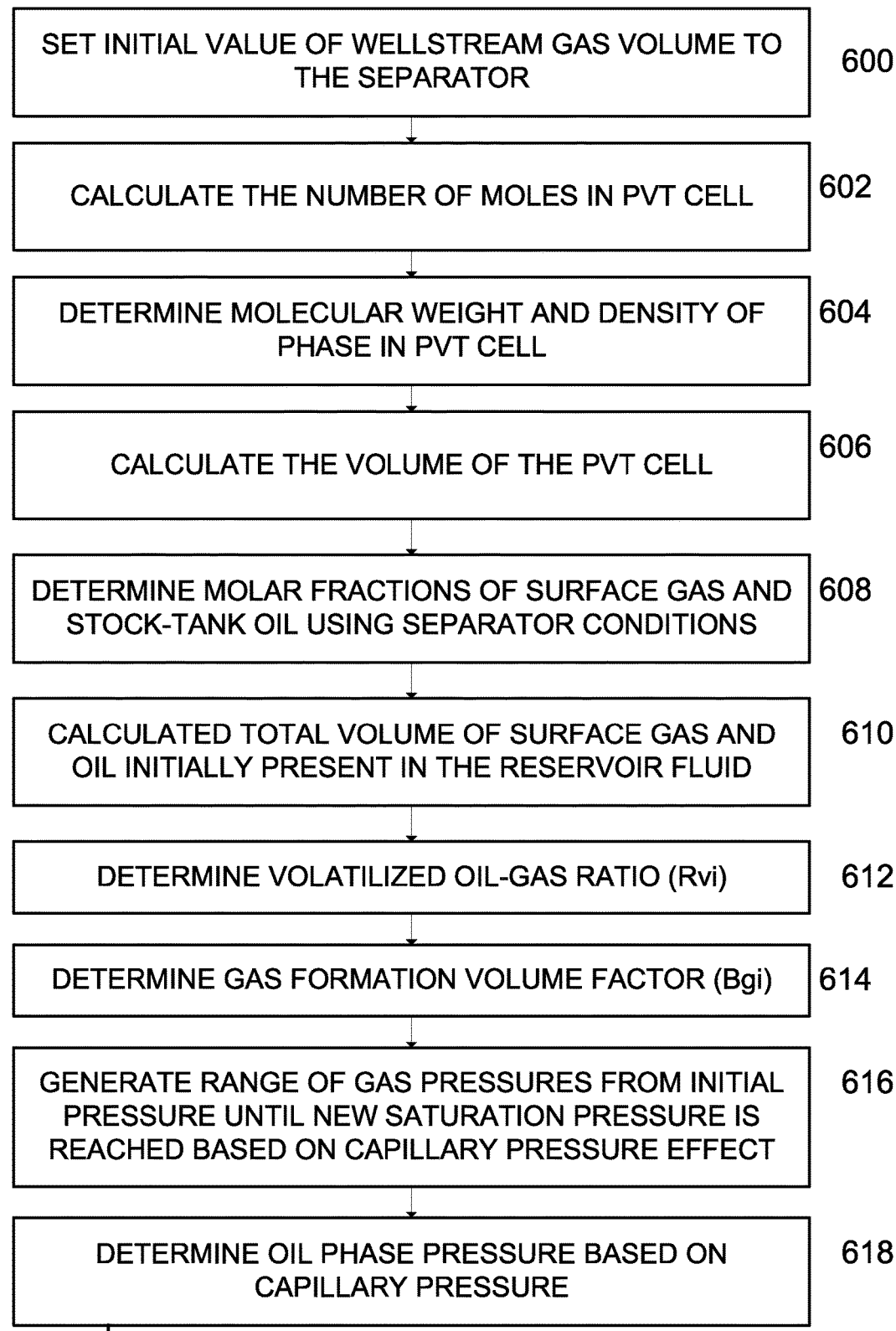
FIG. 6A is a flow chart of an embodiment of determining PVT properties of the reservoir gas incorporating capillary pressure according to the present disclosure

FIG. 6A is a flow chart of an embodiment of a method of determining PVT properties of the reservoir gas that incorporates the effects of capillary pressure. Similar to the methods above the method is executed by the controller or other computing device in communication with the controller based on stored program code instructions and input data. This method is implemented based on a system that employs three separators. The steps of the flow chart apply if has been determined that the reservoir is a single-phase gas reservoir. In a first step (600) an initial value for the wellstream gas volume input to the separator is set. In some implementations this value is set at $G_e$=1,000,000 scf (standard cubic feet). In step (602), the number of moles in the PVT cell of the reservoir is calculated as:

$$n_T (\text{lbmol}) = \frac{P_{pc} * G_e}{10.73 * T_{pc}} \quad (71)$$

The molecular weight and density of the PVT cell are then determined in step (604) using a shift factor at saturation pressure:

$$MW_T = \Sigma c_i * MW_i \quad (72)$$

$$\rho_T = \rho_{vsh} \quad (73)$$

In step (606) the volume of the PVT cell is calculated as $$V_T(\text{ft}^3) = \frac{n_T * MW_T}{\rho_T} \quad (74)$$

In the following step (608), the molar fractions of surface gas and stock-tank oil using the separator conditions are determined. This step includes a number of sub-procedures shown in the flow chart of FIG. 6D to which reference is directed. In step (672), full Flash calculations described above are executed using the temperature and pressure readings at a first separator. The output of this process comprises: i) $x_i1$: liquid composition from the first separator; ii) $y_i1$: gas composition from the first separator; iii) $\alpha_g1$: equilibrium gas molar fraction from the first separator; and iv) $\alpha_o1$: equilibrium oil molar fraction from the first separator.

In steps (674) and (676), full Flash calculations are performed for the second and third separators, yielding analogous outputs.

In step (678) the total molar fractions of the surface gas and stock-tank oil are calculated as:

$$y_o = \alpha_g1 * \alpha_g2 * \alpha_g3 \quad (75)$$

$$y_g = 1 - y_o \text{ (molar fraction of surface gas)} \quad (76)$$

$$x_o = \alpha_g3 \text{ (molar fraction of stock-tank oil)} \quad (77)$$

Returning to FIG. 6A, the total volume of surface gas initially present in the reservoir fluid is calculated in step (610) based on the $y_g$ value in equation (76) as:

$$G = y_g * n_T * 3790.56 \quad (78)$$

Similarly, the total volume of surface oil initial present in the reservoir fluid is calculated as:

$$N = (y_o * n_T * MW_{STO})/(\rho_{STO}) * 5.615 \text{ (in standard barrels)} \quad (79)$$

in which
$MW_{STO}$: Is the molecular weight of oil obtained from execution of the full flash Calculations using the third Separator pressure and temperature and liquid composition from the second separator ($x_i3$).
$\rho_{STO}$: Is the density of oil phase after the volume-shift ($\rho_{lsh}$) obtained from execution of the full 1 Flash Calculations using the third Separator pressure and temperature and liquid composition from the second separator ($x_i3$).

From the values for G and N, in steps (612) and (614) respectively, the volatilized oil-gas ratio and initial gas formation volume factor are determined:

$$R_{vi} = (N/G) * 10^6 \text{ (volatilized oil-gas ratio)} \quad (80)$$

$$B_{gi} = (V_T(RB) * G) * 10^3 \text{ (initial gas formation volume factor)} \quad (81)$$

In step (616), a range of gas pressures is generated from the initial pressure until a new saturation pressure is determined based on the capillary pressure effect and the previously calculated saturated pressure. In step (618), the oil phase pressures corresponding to the range of pressures is determined based on:

$$p_o = p_g - p_{cgo} \quad (82)$$

Figure 6B:
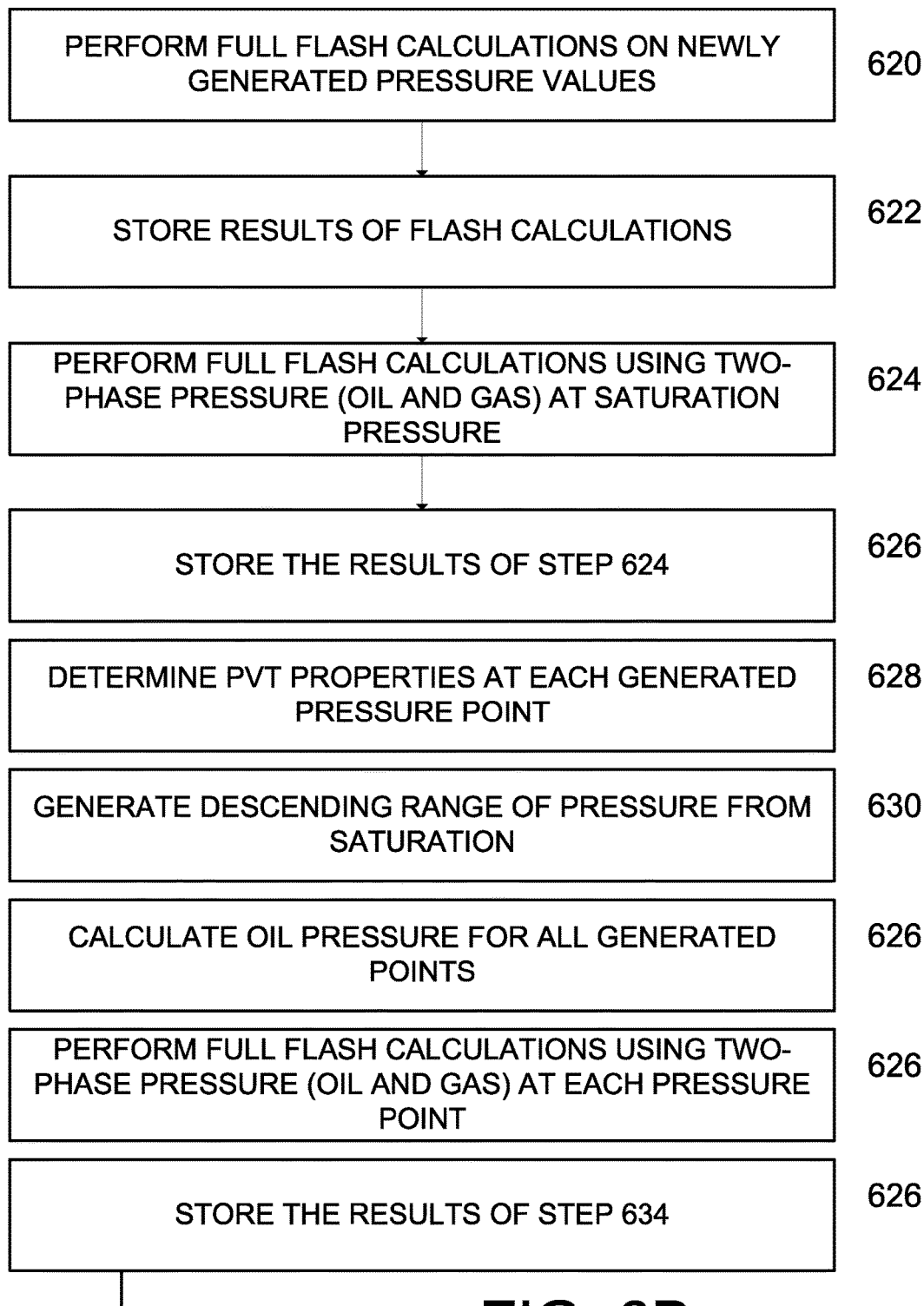
FIG. 6B is a continuation of FIG. 6A.

Referring to FIG. 6B, which is a continuation of FIG. 6A, in a following step (620), for all pressure values generated above the saturation pressure level, full Flash calculation are performed using only the single gas phase pressure. The output of the calculations on the pressure values are stored for future use in step (622). With respect to the saturation pressure, in step (624), full Flash Calculations are performed using the two-phase pressure (oil and gas). The output of this calculation is stored in step (626). However, since oil forms as droplets at saturation pressure, the properties of oil are not reflected on the PVT table of outcomes. In step (628), at each pressure point (1 ... k ... n) the following PVT properties are determined:

$$V_T(RB)_k = (n_T * MW_T)/[(\rho_{vsh})_k * 5.615] \text{ (volume of the PVT cell)} \quad (83)$$

$$(B_g)_k = (B_{gi} * V(RB)_k)/V_T(RB) \text{ (Gas formation volume factor)} \quad (84)$$

$$(R_v)_k = R_{vi} \text{ (volatilized oil/gas ratio)} \quad (85)$$

For each generated pressure point, the output of the full Flash calculations includes $(\rho_g)_k$, $(\rho_{vsh})_k$, $(\mu_g)_k$, and $(MW_g)_k$. The following properties are zero because of the absence of the oil phase at each pressure point: $(\rho_o)_k$, $(\rho_{lsh})_k$, $(MW_o)_k$, $(B_o)_k$, and $(R_s)_k$.

In step (630), an additional, descending range of pressures are generated from a point just below the saturation pressure to a lower limit value such as 500 psia. Since the steps thus far are still operating based on identification of the reservoir as a gas reservoir, the newly generated pressure values are still considered gas phase-only pressure, and do not fully account for a two-phase solution. Therefore, in step (632), the oil pressure is calculated for each of the newly generated pressure values based on equation (43) above. In step (634), the controller performs full Flash Calculations using the two-phase pressures (oil and gas); the output of these calculations is stored in step (636). The following output of the full phase calculations for each pressure point includes: $(\mu_g)_j$, $(\rho_{vsh})_j$, $(\mu_g)_j$, and $(MW_g)_j$. The output of the full Flash Calculations also includes the following properties for the oil phase at each pressure point: $(\rho_o)_1$, $(\rho_{lsh})_j$, $(\mu_o)_j$, and $(MW_o)_j$.

Figure 6C:
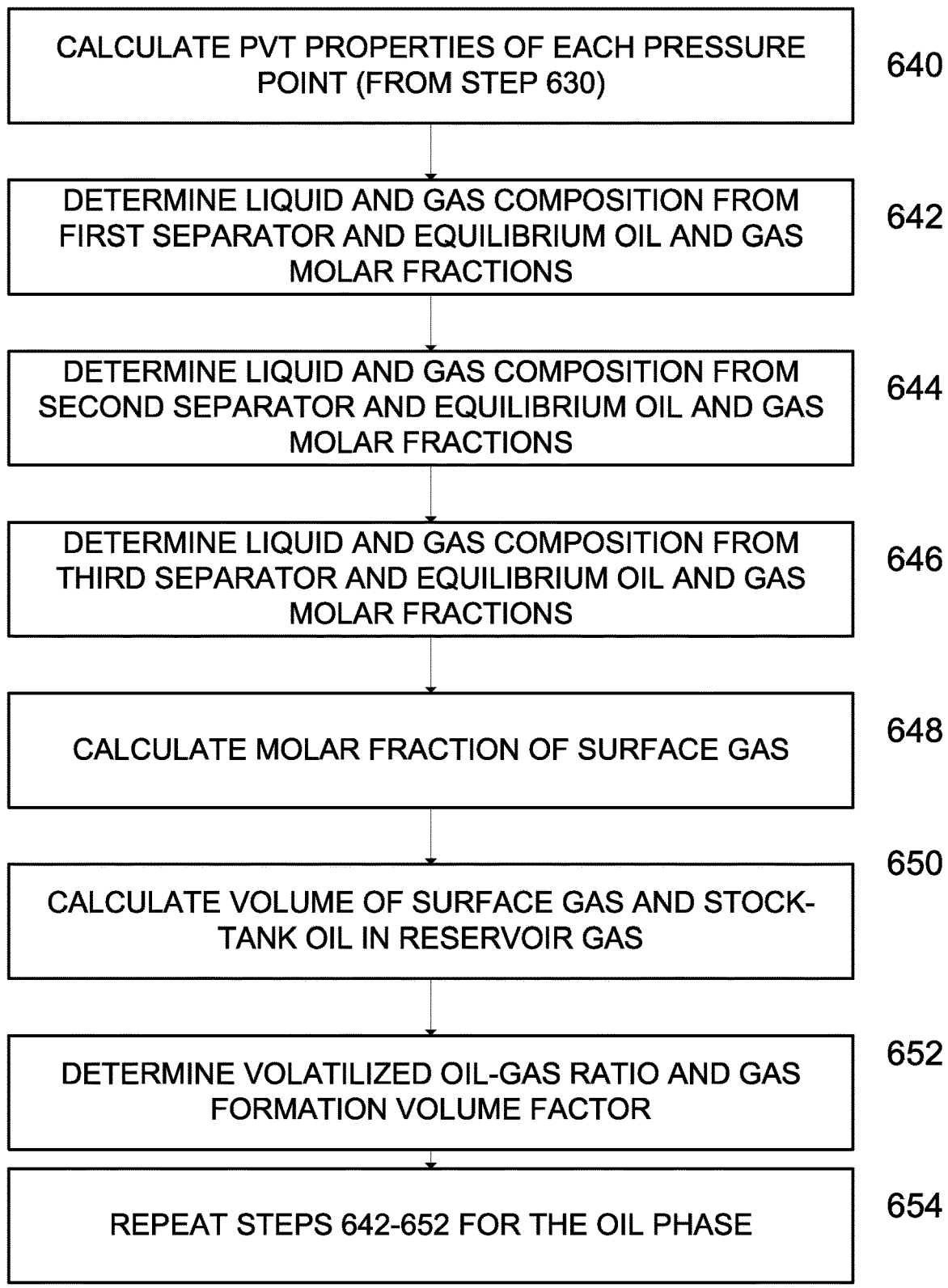
FIG. 6C is a continuation of FIG. 6B.
Figure 6D:
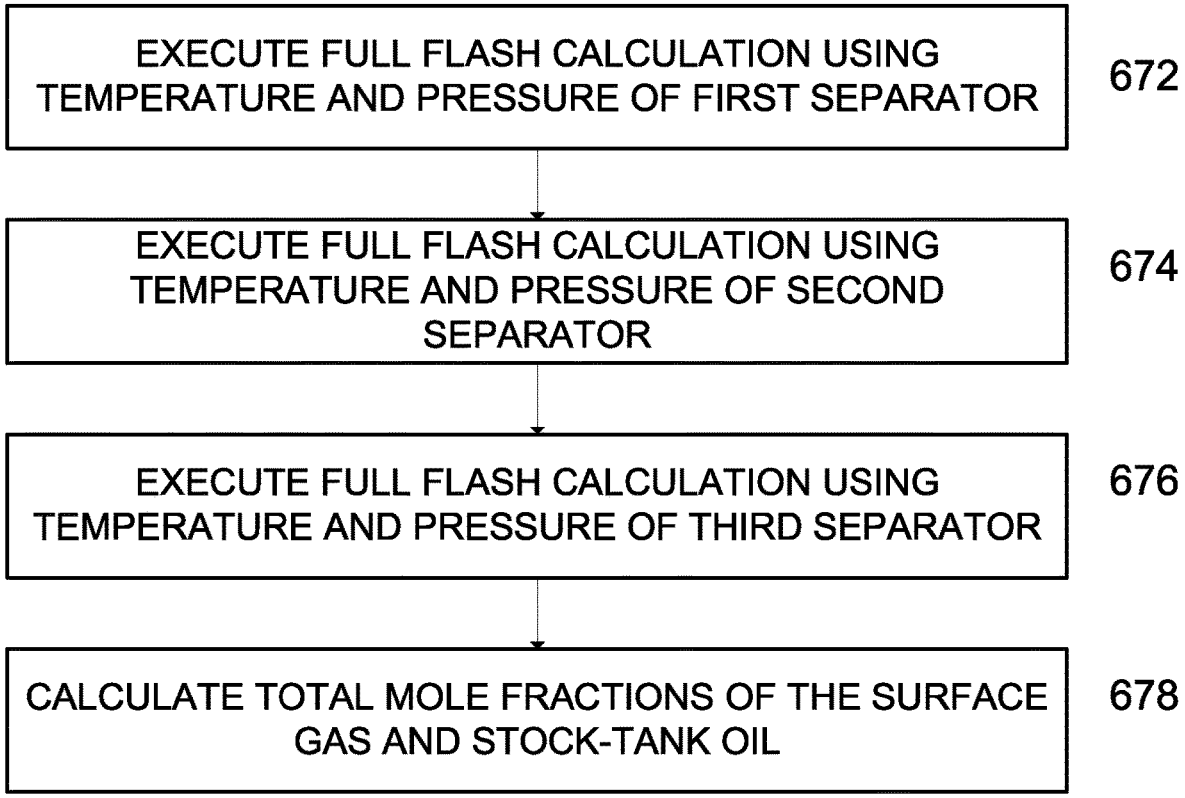
FIG. 6D is flow chart of a sub-procedure of the method of FIGS. 6A to 6C.

Referring to FIG. 6C, which is a continuation of FIG. 6B, in the following calculation step of the PVT algorithm (640), the following PVT properties are calculated at each pressure point (denoted with a subscript "j"):

$$(n_{geg})_j = (n_T)_j * (\alpha_g)_j \text{ (number of moles before excess gas removed)} \quad (86)$$

$$(n_o)_j = (n_T)_j * (1 - \alpha_g)_j \text{ (number of moles of oil)} \quad (87)$$

$$(V_{geg})_j = [(n_{geg})_j * (MW_g)_j]/[(\rho_{vsh})_j * 5.615] \text{ (gas volume in PVT cell prior to remove of excess gas)} \quad (88)$$

$$(V_o)_j = [(n_o)_j * (MW_l)_j]/[(\rho_{lsh})_j * 5.615] \text{ (volume of oil in the PVT cell)} \quad (89)$$

$$(V_g)_j = V_T(RB)_j - (V_o)_j \text{ (gas volume in PVT cell)} \quad (90)$$

$$(V_{greg})_j = (V_{geg})_j - (V_g)_j \text{ (excess gas volume removed from PVT cell)} \quad (91)$$

$$(n_g)_j = [(V_g)_j * (\rho_{vsh})_j * 5.615]/(MW_g)_j \text{ (moles of gas)} \quad (92)$$

$$(n_{greg})_j = [(V_{greg})_j * (\rho_{vsh})_j * 5.615]/(MW_g)_j \text{ (moles of excess gas)} \quad (93)$$

$$(n_T)_j = (n_T)_{j-1} * (n_{greg})_j \text{ (updated no. of moles in PVT cell)} \quad (94)$$

$$(c_i)_j = \{[(x_i)_j * (n_o)_j] + [(y_i)_j * (n_g)_j]\}/(n_T)_j \text{ (updated overall composition of PVT cell)} \quad (95)$$

In step (642), the first Separator pressure and temperature and gas phase composition $(y_i)_j$ obtained in step (608) and the output of the full Flash Calculations described above are used to determine: i) $(x_{ig}1)_j$: the liquid composition from the first separator; ii) $(y_{ig}1)_j$: the gas composition from the first separator; iii) $\alpha_{gg}1$: the equilibrium gas molar fraction from the first separator; and iv) $\alpha_{og}1$: the equilibrium oil molar fraction from the first separator. In the following step (644) of the algorithm, the second Separator pressure and temperature and liquid composition from the first separator $(x_{ig}1)_j$ and the output of the full Flash Calculations to determine: i) $(x_{ig}2)_j$: ii) the liquid composition from the second separator; $(y_{ig}2)_j$: the gas composition from the second separator; iii) $\alpha_{gg}2$: the equilibrium gas molar fraction from the second separator; and iv) $\alpha_{og}2$: the equilibrium oil molar fraction from the second separator. Similarly, in step (646) the third Separator pressure and temperature and liquid composition from the second separator $(x_{ig}2)_j$ and the output of the full Flash Calculations are used to determine: i) $(x_{ig}3)_j$: the liquid composition from the third separator; ii) $(y_{ig}3)_j$: the gas composition from the third separator; iii) $\alpha_{gg}3$: the equilibrium gas molar fraction from the third separator; and iv) $\alpha_{og}3$: the equilibrium oil molar fraction from the third separator.

In step (648), the molar fraction of surface gas is calculated by the controller from:

$$(y_o)_j = \alpha_{og}1 * \alpha_{og}2 * \alpha_{og}3 \quad (96)$$

as $$(y_g)_j = 1 - (y_o)_j \quad (97)$$

From the calculations of equations (96) and (97), in step (650) the controller calculates the volume of surface gas in the reservoir gas and the stock-tank oil in the reservoir gas as:

$$(G_{fg})_j = (y_g)_j * (n_g)_j * 379.56 \quad (98)$$

$$(N_{fg})_j = [(y_o)_j * (n_g)_j * MW_{STO}]/[(\rho_{lsh})_j * 5.615] \quad (99)$$

Using the values obtained from equations (98) and (99), in step (652) the controller determines the volatized oil-gas ratio and gas formation volume factor as follows:

$$(R_v)_j = \left[\frac{(N_{fg})_j}{(G_{fg})_j}\right] / 1e6 \quad (100)$$

$$(B_g)_j = [(V_g)_j/(G_{fg})_j] * 1000 \quad (101)$$

Thereafter, step (642), (644), (646), (648) and (650) are repeated for the oil phase $(x_i)_j$ with the full Flash calculations. These steps are collectively grouped under step (654).

D.2 Determination of PVT Properties (Oil Reservoir)

If the reservoir has been determined to be better characterized as an oil reservoir, some of the steps described above in section D.1 are repeated. In particular, all of steps (600) through (652) are repeated at generated pressure point above saturation, at saturation and below saturation to 500 psia. The procedures yield values for solution gas-oil ratio:

$$(R_s)_k = (G_{fo})_k/(N_{fo})_k \quad (102)$$

and oil formation volume factor:

$$(B_o)_k = (V_o)_k/(N_{fo})_k \quad (103)$$

Operating an Oil/Gas Facility Using Improved PVT Properties

The above-described algorithm determines PVT properties, i.e., gas/oil ratios and oil and gas formation factors, taking pore capillary pressure and two-phase pressures into account. Accordingly, the calculations of the PVT parameters are deemed to be more accurate than conventional calculations. The more accurate parameters can be used as inputs to control algorithms that set separator and/or other processing parameters based upon the improved input data. For example, accounting for two-phase pressure enables the single-phase fluid initially found in the reservoir to split into gas and oil earlier during production.

Figure 7:
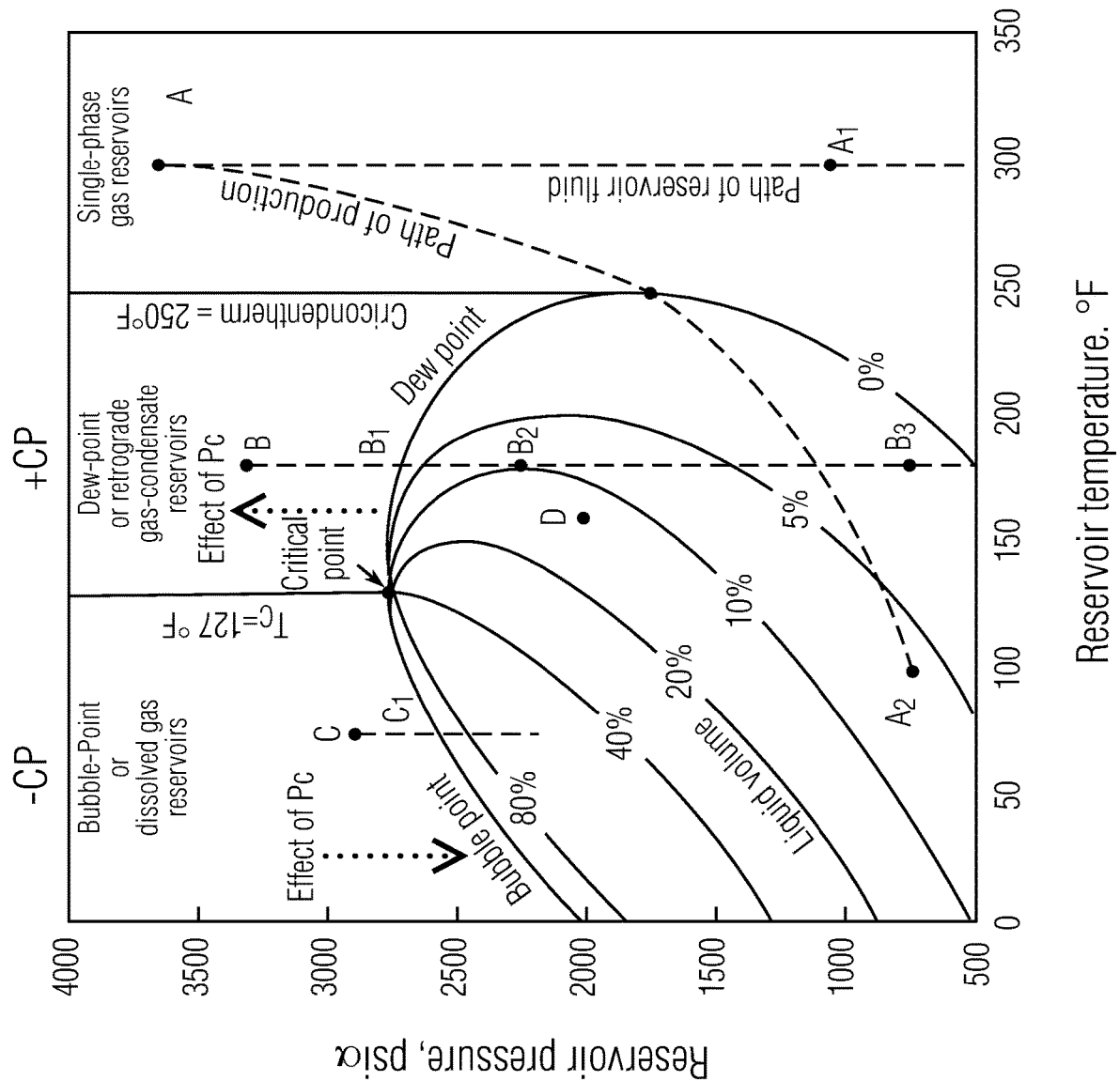
FIG. 7 is an exemplary conventional pressure-temperature phase diagram according to the prior art used for reservoir classification. In this diagram the effect of capillary pressure is not taken into account.

FIG. 7 is a pressure-temperature phase diagram used for reservoir classification that does not take into account the effect of capillary pressure. In the diagram, the middle vertical section, starting at the critical point labeled is referred to as the Gas-Condensate two-phase region (labeled +CP). As the fluid in reservoir is being produced isothermally, the saturation pressure (bubble point) at the constant temperature increases when the capillary pressure effect is accounted for. This implies that, at constant temperature, the critical point, and the two-phase region (+CP) is reached earlier in the life of the reservoir, yielding a higher Condensate-to-Gas-Ratio (CGR).

Figure 8:
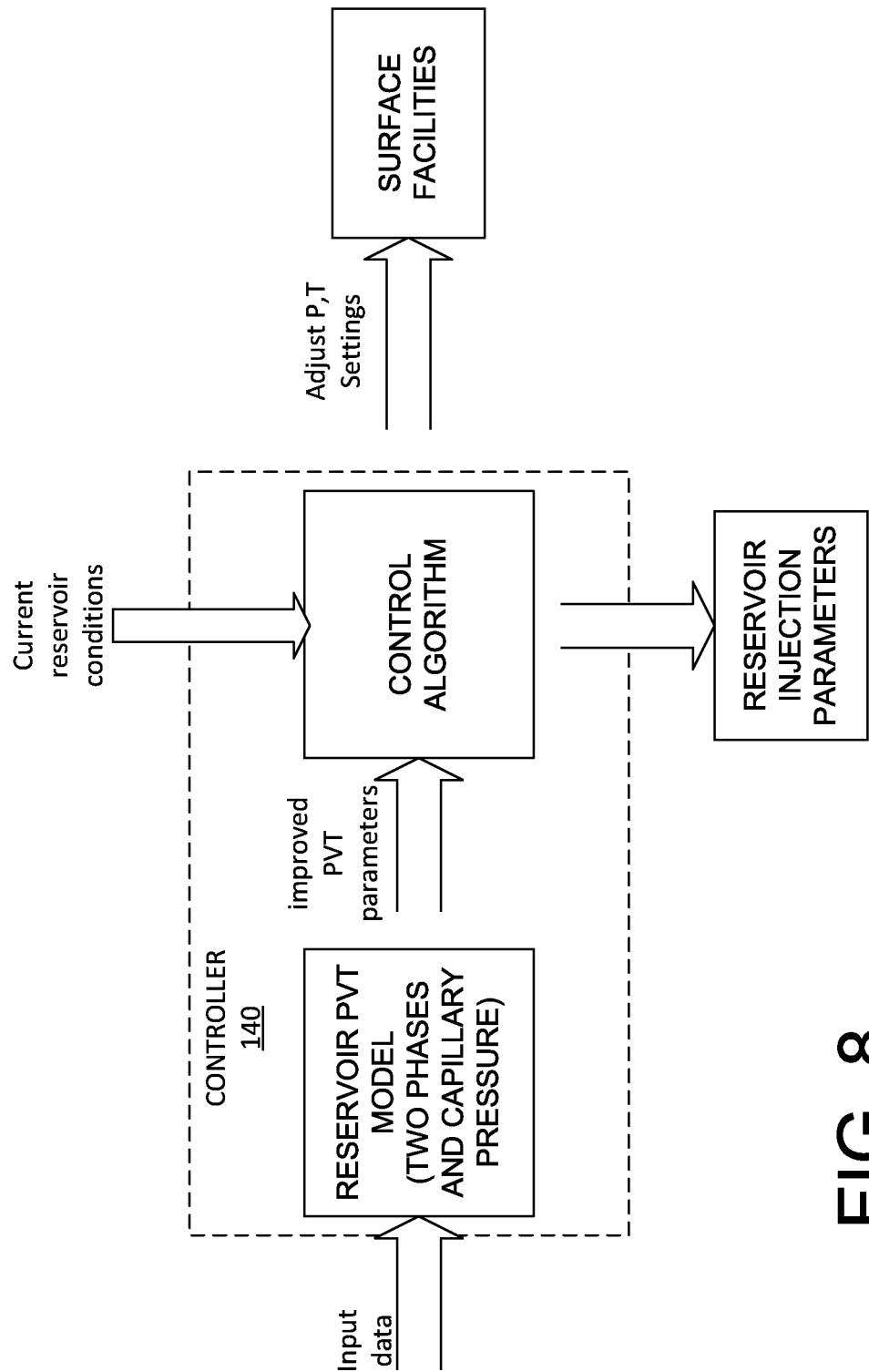
FIG. 8 is a schematic flow diagram of a method of operating an oil/gas facility using improved PVT parameters according to an embodiment of the method disclosed herein.

FIG. 8 is a flow diagram showing a control scheme, executed by the controller based on stored program code instruction, for adjusting surface facilities pressure and temperature to accommodate changes in composition according to the present disclosure. In FIG. 8 the controller 140 receives input data and the outputs of the algorithms discussed above with reference to FIGS. 3-6D including capillary pressure and PVT parameter values. Using the PVT parameter outputs, which describe the oil/gas composition, including the vaporized oil-gas ratio ($R_v$), the solution gas-oil ratio ($R_s$), and the formation volume factors for oil ($B_o$) and gas ($B_g$), as well as data concerning current reservoir conditions, the controller executes a control algorithm adapted to control setting of the surface facilities. In part, the control algorithm adjusts the pressure and temperature at surface facilities accommodate the changes in the PVT values (i.e., relative oil/gas composition) when the pore capillary pressure is properly accounted for. In addition, in cases in which injection is required to maintain the reservoir pressure in the gas-condensate reservoirs, correct assessment of the saturation pressure is important in maintaining reservoir pressure above the saturation point to maintain single-phase conditions and thereby avoid condensate formation and blockage. When gas-condensate operation is detected, the controller 140 the controller can execute program code adapted to increase water injection rates to increase injection pressure up to the elevated saturation pressure level associated with capillary pressure in this phase region.

Returning again to FIG. 7, in the region to the left of the critical point (labeled −CP) as the reservoir is being produced isothermally, the saturation pressure decreases when the effect of capillary pressure is accounted for. This implies that in this phase region, production of dry oil can continue beyond expectations before the reservoir pressure decreases to the lower saturation pressure at which a 2-phase split occurs. The algorithm executed by the controller 140 can detect that the reservoir is operating in this phase region and can control surface facilities settings accordingly to accommodate the longer period of dry oil production.

More generally, the methods disclosed herein provide greater accuracy in the calculation of reservoir pressures, saturation pressures, composition ratio, and oil recovery.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A non-transitory computer-readable medium comprising instructions which, when executed by a computer system, cause the computer system to carry out a method of operating an oil/gas facility for processing oil and gas from a reservoir, including steps of:
    receiving input data concerning condensate phase and gas phase components in the reservoir, the input data characterizing both phase components;
    determining a pore capillary pressure of the reservoir based on the received input data;
    determining pressure, volume and temperature (PVT) parameters of the reservoir phase components based on the determined pore capillary pressure; and
    controlling a setting of the oil/gas facility based on the determined pressure, volume and temperature (PVT) parameters of the reservoir phase components.

2. The non-transitory computer-readable medium of claim 1, wherein the step of determining the pressure, volume and temperature (PVT) parameters includes calculations that account for both gas and condensate phase pressures.

3. The non-transitory computer-readable medium of claim 1, further including instructions for carrying out the step of determining of a phase region of the reservoir.

4. The non-transitory computer-readable medium of claim 3, wherein the step of controlling the setting of the oil/gas facility based on the determined pressure, volume and temperature (PVT) parameters includes adjusting surface facilities settings to accommodate a higher saturation pressure and condensate-to-gas ratio due to the pore capillary pressure when the reservoir is operating in a two-phase gas-condensate region.

5. The non-transitory computer-readable medium of claim 3, wherein the step of controlling the setting of the oil/gas facility based on the determined pressure, volume and temperature (PVT) parameters includes adjusting surface facilities settings to accommodate a lower saturation pressure and larger dry oil production due to the pore capillary pressure when the reservoir is operating in a dissolved-gas phase region.

6. The non-transitory computer-readable medium of claim 3, wherein the step of controlling the setting of the oil/gas facility includes increasing a water injection rate to support reservoir pressure when the reservoir is operating in a two-phase gas-condensate region.

7. The non-transitory computer-readable medium of claim 1, wherein the pressure, volume and temperature (PVT) parameters include one or more parameters selected from the group consisting of: vaporized oil-gas ratio ($R_v$), solution-gas ratio ($R_s$), formation volume factor for gas ($B_g$) and formation volume factor for oil (Bo).

8. The non-transitory computer-readable medium of claim 7, further including instructions for carrying out the step of calculating one or more of a vaporized oil-gas ratio ($R_v$), a solution-gas ratio ($R_s$), a formation volume factor for gas ($B_g$) and a formation volume factor for oil (Bo) as a function of one or more of a gas pressure (Pg), an oil pressure (Po) and a pore throat radius (r).

9. A system for operating an oil/gas facility for processing oil and gas from a reservoir, the system comprising:
    at least one facility component having a setting that is configured to be adjusted based on a current saturation pressure of the reservoir; and
    a controller including one or more processors and a memory, the memory including program code instructions which, when executed by the one or more processors, carries out the steps of:
    receiving input data concerning condensate phase and gas phase components in the reservoir, the input data characterizing both phase components;
    determining a pore capillary pressure of the reservoir based on the received input data;
    determining pressure, volume and temperature (PVT) parameters of the reservoir phase components based on the determined pore capillary pressure; and
    controlling the setting of the at least one facility component based on the determined pressure, volume and temperature (PVT) parameters of the reservoir phase components.

10. The system of claim 9, wherein the at least one facility component is an oil/gas separator.

11. The system of claim 9, wherein the step of determining the pressure, volume and temperature (PVT) parameters includes calculations that account for both gas and condensate phase pressures.

12. The system of claim 9, wherein the code executed by the one or more processors of the controller further includes instructions for carrying out the step of determining of a phase region of the reservoir.

13. The system of claim 12, further comprising:
a water injection pump for maintaining fluid pressure within the reservoir;
wherein the step of controlling a setting of the oil/gas facility includes increasing a water injection rate of the pump to support reservoir pressure when the reservoir is operating in a two-phase gas-condensate region.

14. The system of claim 9, wherein the pressure, volume and temperature (PVT) parameters include one or more of the following: a vaporized oil-gas ratio ($R_v$), a solution-gas ratio ($R_s$), a formation volume factor for gas ($B_g$) and a formation volume factor for oil (Bo).

15. The system of claim 14, wherein the code executed by the one or more processors of the controller further includes instructions for carrying out the step of calculating one or more of the following parameters: the vaporized oil-gas ratio ($R_v$), the solution-gas ratio ($R_s$), the formation volume factor for gas ($B_g$) and the formation volume factor for oil (Bo) as a function of gas pressure (Pg), oil pressure (Po) and pore throat radius (r).

16. A system for operating an oil/gas facility for processing oil and gas from a reservoir, the system comprising:
at least one facility component having a setting that is configured to be adjusted based on a current saturation pressure of the reservoir; and
a controller including one or more processors and a memory, the memory including program code instructions which, when executed by the one or more processors, carries out the steps of:
receiving input data concerning condensate phase and gas phase components in the reservoir, the input data characterizing both phase components;
determining a pore capillary pressure of the reservoir based on the received input data;
determining pressure, volume and temperature (PVT) parameters of the reservoir phase components based on the determined pore capillary pressure; and
controlling the setting of the at least one facility component based on the determined parameters of the reservoir phase components;
wherein the step of setting of the oil/gas facility based on the determined pressure, volume and temperature (PVT) parameters includes adjusting the at least one facility component to accommodate a higher saturation pressure and condensate-to-gas ratio due to the pore capillary pressure when the reservoir is operating in a two-phase gas-condensate region.

17. A system for operating an oil/gas facility for processing oil and gas from a reservoir, the system comprising:
at least one facility component having a setting that is configured to be adjusted based on a current saturation pressure of the reservoir; and
a controller including one or more processors and a memory, the memory including program code instructions which, when executed by the one or more processors, carries out the steps of:
receiving input data concerning condensate phase and gas phase components in the reservoir, the input data characterizing both phase components;
determining a pore capillary pressure of the reservoir based on the received input data;
determining pressure, volume and temperature (PVT) parameters of the reservoir phase components based on the determined pore capillary pressure; and
controlling the setting of the at least one facility component based on the determined parameters of the reservoir phase components;
wherein the step of setting of the oil/gas facility based on the determined pressure, volume and temperature (PVT) parameters includes adjusting the at least one facility component to accommodate a lower saturation pressure and larger dry oil production due to the pore capillary pressure when the reservoir is operating in a dissolved-gas phase region.

* * * * *